(12) United States Patent
Ooyama et al.

(10) Patent No.: US 9,488,899 B2
(45) Date of Patent: Nov. 8, 2016

(54) **STROBE DEVICE AND IMAGING DEVICE PROVIDED WITH STROBE DEVICota)

(71) Applicant: PANASONIC CORPORATION, Osaka (JP)

(72) Inventors: Kazuhiko Ooyama, Hyogo (JP); Yutaro Matsui, Osaka (JP); Shinya Maeda, Osaka (JP); Takashi Umehara, Osaka (JP); Toshiaki Takenaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/418,491

(22) PCT Filed: Aug. 19, 2013

(86) PCT No.: PCT/JP2013/004887
§ 371 (c)(1),
(2) Date: Jan. 30, 2015

(87) PCT Pub. No.: WO2014/030329
PCT Pub. Date: Feb. 27, 2014

(65) Prior Publication Data
US 2015/0185589 A1    Jul. 2, 2015

(30) Foreign Application Priority Data

Aug. 23, 2012 (JP) ................. 2012-183963

(51) Int. Cl.
| | |
|---|---|
| *G03B 15/02* | (2006.01) |
| *G03B 15/05* | (2006.01) |
| *H04N 5/225* | (2006.01) |
| *H04N 5/232* | (2006.01) |
| *H04N 5/235* | (2006.01) |

(52) U.S. Cl.
CPC ............ *G03B 15/05* (2013.01); *H04N 5/2252* (2013.01); *H04N 5/2256* (2013.01); *H04N 5/2354* (2013.01); *H04N 5/23245* (2013.01); *G03B 2215/056* (2013.01); *G03B 2215/0521* (2013.01); *G03B 2215/0528* (2013.01)

(58) Field of Classification Search
CPC .......... G03B 15/05; G03B 2215/0521; G03B 2215/0528; G03B 2215/056; H04N 5/2252; H04N 5/2256; H04N 5/23245; H04N 5/2354
USPC ........................................................... 362/5
See application file for complete search history.

(56) References Cited

U.S. PATENT DOCUMENTS 5,911,085 A * 6/1999 Fuke ...................... G03B 15/05
362/18

FOREIGN PATENT DOCUMENTS

| JP | 8-166621 | 6/1996 |
|---|---|---|
| JP | 11-064937 | 3/1999 |
| JP | 2003-134444 | 5/2003 |
| JP | 2009-163179 | 7/2009 |

OTHER PUBLICATIONS

International Search Report of PCT application No. PCT/JP2013/004887 dated Nov. 19, 2013.

* cited by examiner

*Primary Examiner* — Anh Mai
*Assistant Examiner* — Hana Featherly
(74) *Attorney, Agent, or Firm* — McDermott Will & Emery LLP

(57) ABSTRACT

A strobe device is provided with a light-emitting unit rotatably coupled to a strobe body unit detachable from a bracket together with an imaging apparatus, a variable mechanism configured to allow a change in an angle of orientation of the light-emitting unit with respect to the strobe body unit, a driving unit configured to drive the variable mechanism, and a control section configured to control the driving unit. The control section has a control mode to restrain the light-emitting unit from moving to a region in which the imaging apparatus is located when it is detected that the strobe body unit is attached to the bracket. As a result, the strobe device whose the light-emitting unit does not bump against the imaging apparatus can be realized.

3 Claims, 5 Drawing Sheets

STROBE DEVICE AND IMAGING DEVICE PROVIDED WITH STROBE DEVICE

This application is a U.S. national phase application of the PCT international application No. PCT/JP2013/004887.

TECHNICAL FIELD

The present invention relates to an irradiating direction adjustable strobe device that can change an angle of orientation of a light-emitting unit and an imaging apparatus provided with the strobe device.

BACKGROUND ART

Conventionally, for the purpose of obtaining more natural photographs, imaging apparatuses have been configured to use bounce photography which is a technique of capturing an image by causing a light-emitting unit of a strobe device to emit light and irradiate a reflective object such as a ceiling or a wall to diffuse the light so that a subject is indirectly illuminated by the diffused light.

Specifically, the bounce photography is a technique of capturing a subject image not by directing a irradiating surface of the light-emitting unit of the strobe device toward the subject but by directing the irradiating surface in a desired direction toward the reflective object such as a ceiling or a wall to cause the light emitted from the strobe device to be reflected from the reflective object and to illuminate the subject.

Then, there has been proposed a configuration of a conventional strobe device to automatically control a bounce angle formed between a capturing direction which is an optical axis direction of a capturing lens and a irradiating direction in which the strobe device irradiates (a desired direction toward the reflective object) by using a control section of the strobe device (see, for example, PTL1). It is described in PL1 that the strobe device with the above described configuration can indirectly illuminate the subject by always directing the light-emitting unit toward a reflective object during the irradiation.

In addition, the strobe device described in PL1 measures the distance with autofocus by directing the capturing lens of the imaging apparatus toward a ceiling (the reflective object) and the subject respectively and sets the bounce angle based on distances from the reflective object and the subject to capture an image of the subject.

At that moment, the strobe device is usually attached to a hot shoe provided on a top side of the imaging apparatus.

Alternatively, the strobe device is sometimes used while being attached to a bracket together with the imaging apparatus. In that case, the imaging apparatus and the strobe device are set adjacent to each other on the bracket. On that occasion, in a case where the strobe device is configured to automatically change an angle of orientation of the light-emitting unit, the light-emitting unit may bump against the imaging apparatus. Accordingly, a drive system of the strobe device is damaged.

In addition, when a user who uses the strobe device attached to the hot shoe of the imaging apparatus captures an image of a subject by using a finder of the imaging apparatus, the light-emitting unit may bump against a head or the like of the user as in the above described case. That may not only damage a drive system of the strobe device but also make trouble for the user.

CITATION LIST

Patent Literature

PTL1: Unexamined Japanese Patent Publication No. 2009-163179

SUMMARY OF THE INVENTION

In order to solve the above described problems, the strobe device according to the present invention is provided with a strobe body unit detachable from a bracket together with an imaging apparatus, a light-emitting unit rotatably coupled to the strobe body unit, a variable mechanism configured to allow a change in an angle of orientation of the light-emitting unit with respect to the strobe body unit, a driving unit configured to drive the variable mechanism, and a control section configured to control the driving unit. The control section is provided with a detector configured to detect that the strobe body unit is attached to the bracket. In addition, the control section has a control mode to restrain the light-emitting unit from moving to a region in which the imaging apparatus is located, while the detector is in a state of detecting that the strobe body unit is attached to the bracket.

With the above described configuration, the control section controls the driving unit so that the driving unit drives the variable mechanism to change the angle of orientation of the light-emitting unit with respect to the strobe body unit. On that occasion, when the strobe body unit is attached to the bracket, i.e., when the strobe device is attached to the bracket, the control section is informed by the detector that the strobe device has been attached to the bracket. Then, the control section controls the driving unit to restrain the light-emitting unit from moving to a region in which the imaging apparatus is located by a control mode. In that manner, the control section can prevent the movement of the light-emitting unit to the region in which the imaging apparatus is located in the case where the strobe device is attached to the bracket together with the imaging apparatus. Therefore, the strobe device that prevents a drive system of the strobe device from being damaged and has superior reliability can be realized.

Further, the strobe device according to the present invention is provided with a strobe body unit detachable from an imaging apparatus, a light-emitting unit rotatably coupled to the strobe body unit, a variable mechanism configured to allow a change in an angle of orientation of the light-emitting unit with respect to the strobe body unit, a driving unit configured to drive the variable mechanism, and a control section configured to control the driving unit. The control section is provided with a detector configured to detect that the strobe body unit is attached to an accessory shoe and a user uses a finder of the imaging apparatus. In addition, the control section has a control mode to restrain the light-emitting unit from moving to a region in which the user of the imaging apparatus is present, while the detector is in the state of detecting that the strobe body unit is attached to the accessory shoe and the user uses the finder of the imaging apparatus.

With the above described configuration, the control section controls the driving unit so that the driving unit drives the variable mechanism to change the angle of orientation of the light-emitting unit with respect to the strobe body unit. At that moment, the control section detects that the strobe body unit is attached to the accessory shoe and also that the user uses the finder via the detector by communication from a camera (an imaging apparatus) side. For a specific detecting method, an optical sensor, for example, is provided on an eyepiece of the imaging apparatus. Then, the optical sensor is shaded by a face of the user who is looking into the finder. In that case, the imaging apparatus usually has a function of switching from a liquid crystal monitor to an electronic view finder. Therefore, the detecting methods include a method for detecting that the user uses the finder by receiving a signal for the switching by the communication.

Then, the control section controls the driving unit to restrain the light-emitting unit from moving to a region in which the user is present by the control mode. In that manner, the control section can prevent the light-emitting unit of the strobe device from bumping against the user or damaging the drive system. Therefore, the strobe device that is safe and has superior reliability can be realized.

DESCRIPTION OF EMBODIMENT

A strobe device according to an exemplary embodiment of the present invention and an imaging apparatus provided with the strobe device will be described below with reference to the drawings. It should be noted that the exemplary embodiment below is an example that embodies the present invention and is not intended to limit a technical scope of the present invention.

Exemplary Embodiment

The strobe device according to the present invention and the imaging apparatus provided with the strobe device will be described below with reference to FIG. 1 to FIG. 4B.

Figure 1:
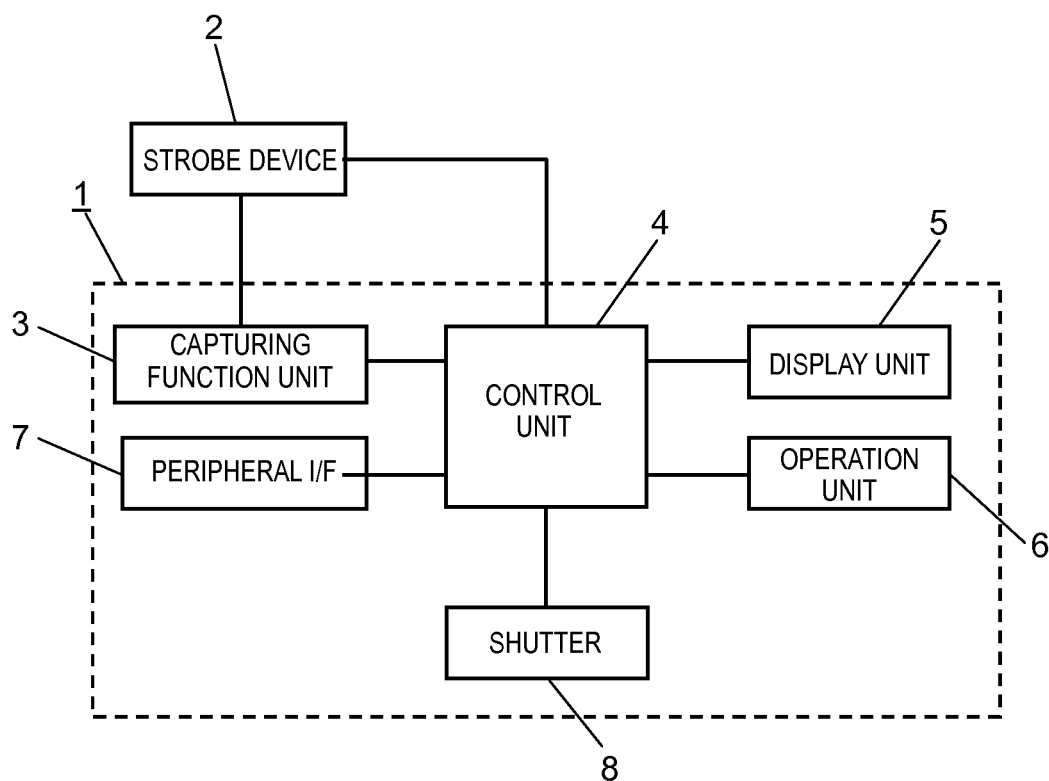
FIG. 1 is a block diagram illustrating a configuration of an imaging apparatus according to an exemplary embodiment of the present invention.

FIG. 1 is a block diagram illustrating a configuration of an imaging apparatus according to an exemplary embodiment of the present invention.

Figure 2:
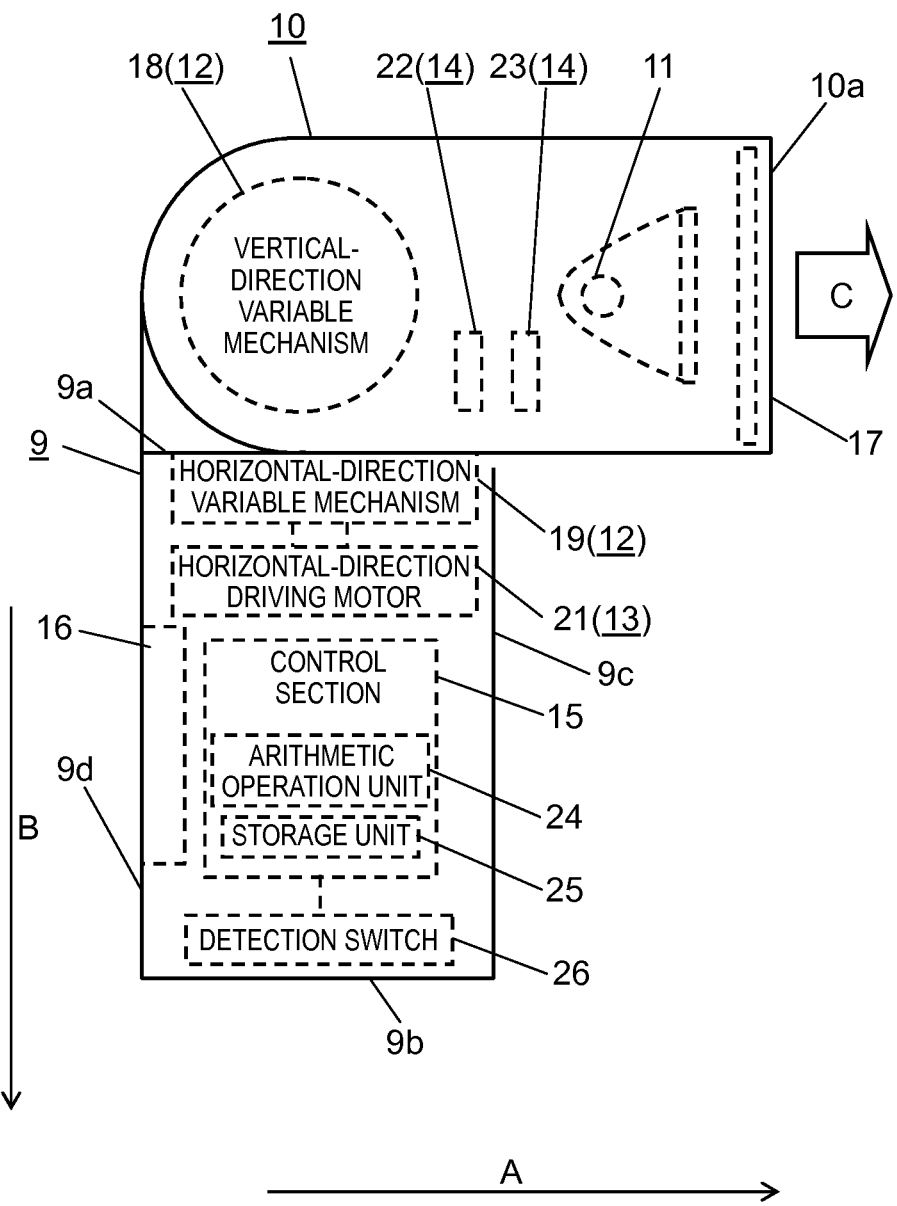
FIG. 2 is a side view of a strobe device according to the exemplary embodiment.
Figure 3:
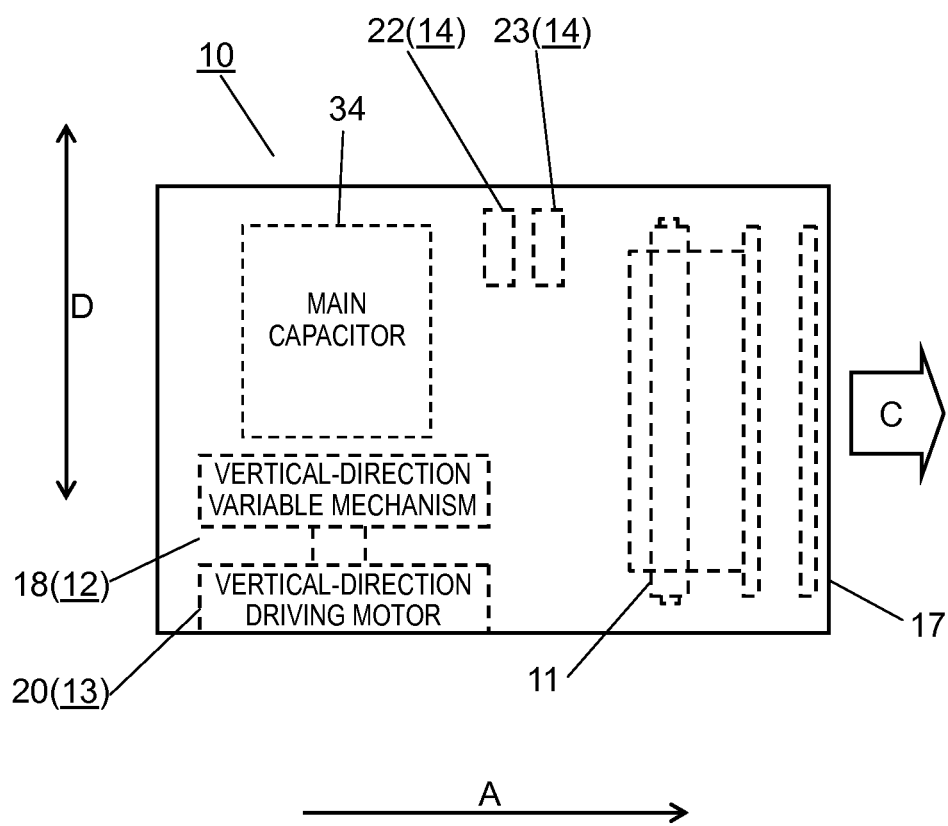
FIG. 3 is a top view of the strobe device according to the exemplary embodiment.
Figure 4A:
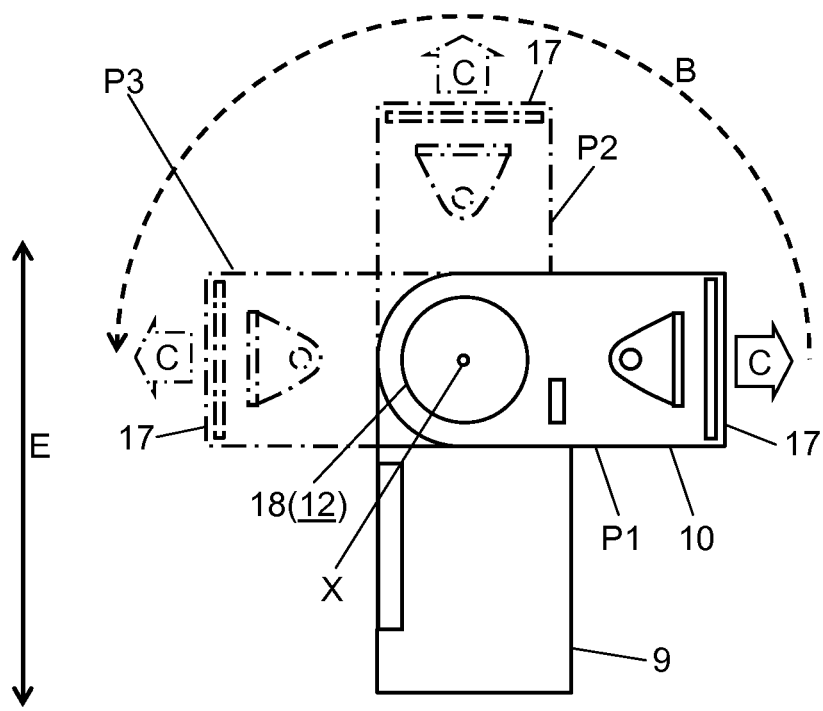
FIG. 4A is a diagram illustrating an up and down irradiation range (a vertical irradiation range) that can be set to the strobe device according to the exemplary embodiment.
Figure 4B:
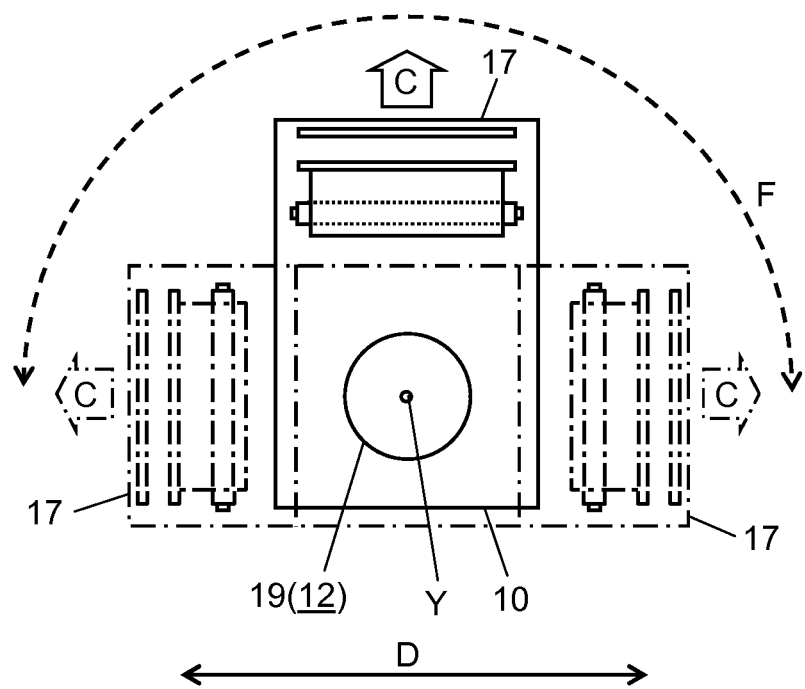
FIG. 4B is a diagram illustrating a left and right irradiation range (a horizontal irradiation range) that can be set to the strobe device according to the exemplary embodiment.

FIG. 2 is a side view of the strobe device according to the exemplary embodiment. FIG. 3 is a top view of the strobe device according to the exemplary embodiment. FIG. 4A is a diagram illustrating an up and down irradiation range (a vertical irradiation range) that can be set to the strobe device according to the exemplary embodiment. FIG. 4B is a diagram illustrating a left and right irradiation range (a horizontal irradiation range) that can be set to the strobe device according to the exemplary embodiment.

As illustrated in FIG. 1, imaging apparatus 1 of the present exemplary embodiment includes capturing function unit 3 configured to capture at least an image of a subject, control unit 4, display unit 5, operation unit 6, peripheral I/F (Interface) 7, and shutter 8. Meanwhile, imaging apparatus 1 is detachably provided with (in a mountable manner) strobe device 2 configured to irradiate a subject with strobe light.

Control unit 4 controls strobe device 2 and capturing function unit 3. Display unit 5 displays a captured subject image and the like. Operation unit 6 switches setting items of capturing conditions and on-off of a power supply. Peripheral I/F 7 inputs and outputs image data and so on to and from a peripheral device. Shutter 8 is operated by a user who wants to cause strobe device 2 to emit light to capture an image of a subject.

In addition, as illustrated in FIG. 2 and FIG. 3, strobe device 2 of the present exemplary embodiment includes at least strobe body unit 9 which is made of, for example, a rectangular housing, light-emitting unit 10, variable mechanism 12, angle detection unit 14, control section 15, operating unit 16, and detector 26 which is made of detection switch 26. Light-emitting unit 10 is rotatably coupled to strobe body unit 9 and accommodates flash discharge tube 11. Then, light-emitting unit 10 causes flash discharge tube 11 to emit light by using, for example, electric energy supplied from main capacitor 34 and radiates the emitted light to outside. Variable mechanism 12 allows light-emitting unit 10 to change an angle of orientation. Driving unit 13 drives variable mechanism 12. Angle detection unit 14 detects an angle of light-emitting unit 10 with respect to strobe body unit 9. Control section 15 controls strobe device 2. Operating unit 16 is provided on, for example, back side 9d of strobe body unit 9 and performs such operations as input of various set values and selection of various modes. Detection switch 26 which forms detector 26 is provided on strobe body unit 9 and detects whether strobe device 2 is detached from imaging apparatus 1 or bracket 30 of FIG. 5.

In addition, light-emitting unit 10 is rotatably coupled to top side 9a of strobe body unit 9. Further, imaging apparatus 1 illustrated in FIG. 1 is connectably provided on bottom side 9b of strobe body unit 9. In that case, strobe body unit 9 is coupled to imaging apparatus 1 so that front 9c of strobe body unit 9 faces in capturing direction A (an optical axis direction of an imaging lens) of imaging apparatus 1. Meanwhile, in the case where strobe device 2 is attached to bracket 30 which is to be described later with reference to FIG. 5, strobe device 2 and imaging apparatus 1 are attached to bracket 30 separately. Also in that case, strobe device 2 is attached to bracket 30 so that front 9c of strobe body unit 9 of strobe device 2 faces in capturing direction A of imaging apparatus 1.

In addition, light-emitting unit 10 is made of, for example, a substantially rectangular housing or a rectangular housing, and has opening portion 17 for radiating the light emitted from flash discharge tube 11, at one surface 10a of the housing. Further, light-emitting unit 10 is configured to be able to change irradiating direction C for emitting strobe light by changing an inclination angle and an orientation of opening portion 17 in vertical direction B.

In addition, variable mechanism 12 includes vertical-direction variable mechanism 18 and horizontal-direction variable mechanism 19 as illustrated in FIG. 2 and rotatably couples strobe body unit 9 with light-emitting unit 10. Specifically, vertical-direction variable mechanism 18 of variable mechanism 12 is coupled to strobe body unit 9 so that vertical-direction variable mechanism 18 is able to rotate in vertical direction B on horizontal shaft X which is provided in strobe body unit 9 in width direction D illustrated in FIG. 3. On the other hand, horizontal-direction variable mechanism 19 of variable mechanism 12 is coupled to strobe body unit 9 so that horizontal-direction variable mechanism 19 is able to rotate in horizontal direction F on vertical shaft Y which is provided in strobe body unit 9 in up and down direction E (height direction: see FIG. 4A).

Further, as illustrated in FIG. 4A, vertical-direction variable mechanism 18 of variable mechanism 12 is provided to be able to change an angle of orientation of light-emitting unit 10 in vertical direction B. Specifically, vertical-direction variable mechanism 18 is provided to couple strobe body unit 9 with light-emitting unit 10 so that vertical-direction variable mechanism 18 is able to rotate the angle of orientation of light-emitting unit 10 in vertical direction B designated by a solid line in FIG. 4A between a usual irradiating direction angle (an angle of light-emitting unit 10 at usual capturing position P1), and desired irradiating direction angles designated by alternate long and short dash lines in FIG. 4A which are set by the user and different from the usual irradiating direction angle (angles of light-emitting unit 10 at bounce photography position P2 and bounce photography position P3). In the present exemplary embodiment, vertical-direction variable mechanism 18 of variable mechanism 12 rotates between usual capturing position P1 and bounce photography position P3 within a rotation angle range of, for example, 180 degrees in a vertical direction.

On the other hand, as illustrated in FIG. 4B, horizontal-direction variable mechanism 19 of variable mechanism 12 is provided to be able to change an angle of orientation of light-emitting unit 10 in horizontal direction F. Further, in the present exemplary embodiment, horizontal-direction variable mechanism 19 has a rotating angle of 180 degrees in a left and right direction.

In addition, as illustrated in FIG. 2 and FIG. 3, driving unit 13 is provided with vertical-direction driving unit 20 illustrated in FIG. 3 which is made of, for example, a vertical-direction driving motor and the like and configured to drive vertical-direction variable mechanism 18 to rotate, and also provided with horizontal-direction driving unit 21 illustrated in FIG. 2 which is made of, for example, a horizontal-direction driving motor and the like and configured to drive horizontal-direction variable mechanism 19 to rotate.

In addition, angle detection unit 14 is provided on light-emitting unit 10 and includes vertical-direction angle detection unit 22 which is configured to detect an angle of light-emitting unit 10 in vertical direction B and horizontal-direction angle detection unit 23 which is configured to detect an angle of light-emitting unit 10 in horizontal direction F.

In this case, in the present exemplary embodiment, vertical-direction angle detection unit 22 is made of, for example, three axes acceleration sensor which is configured to detect acceleration in three directions of the x-axis, the y-axis, and the z-axis. Then, vertical-direction angle detection unit 22 detects an inclination angle of light-emitting unit 10 in vertical direction B of light-emitting unit 10 by using the three axes acceleration sensor to detect gravitational acceleration of light-emitting unit 10 which is at rest. In the present exemplary embodiment, horizontal-direction angle detection unit 23 is made of a magnetic field sensor which is configured to detect a strength and a direction of a magnetic field (or a field). Then, horizontal-direction angle detection unit 23 detects an inclination angle of light-emitting unit 10 in horizontal direction F of light-emitting unit 10 by detecting a compass direction in which light-emitting unit 10 faces.

In addition, control section 15 is provided with arithmetic operation unit 24 which is configured to perform various kinds of arithmetic processing and storage unit 25 which is configured to store various types of information. Control section 15 is made of a CPU, and storage unit 25 is made of a built-in RAM or a built-in ROM of the CPU or a RAM or a ROM externally connected to the CPU.

Then, storage unit 25 of control section 15 stores movement restraining range information of light-emitting unit 10 to be described later. Incidentally, the movement restraining range information is, for example, angular information of light-emitting unit 10 detected by vertical-direction angle detection unit 22 or horizontal-direction angle detection unit 23. Specifically, the movement restraining range information is angular information of light-emitting unit 10 that defines a range of restraining light-emitting unit 10 from entering (from changing the angle), (the range being a region in which the imaging apparatus is located or a region in which the user is present, for example).

A configuration of the strobe device and the imaging apparatus of the present exemplary embodiment attached to a bracket will be specifically described below with reference to FIG. 5.

Figure 5:
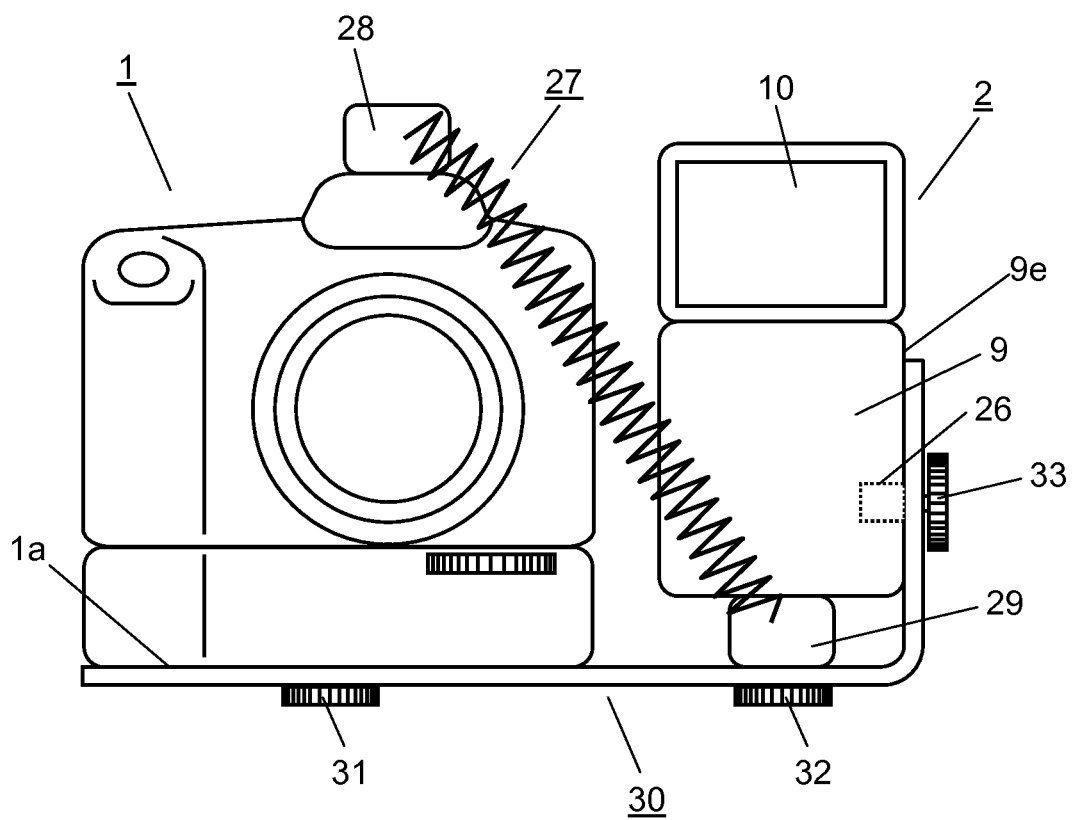
FIG. 5 is a front view illustrating the strobe device according to the exemplary embodiment attached to a bracket together with the imaging apparatus.

FIG. 5 is a front view illustrating the strobe device according to the exemplary embodiment attached to a bracket together with the imaging apparatus.

That is, a case where strobe device 2 according to the exemplary embodiment is attached to bracket 30 together with imaging apparatus 1 and used will be described.

In that case, as illustrated in FIG. 5, strobe device 2 and imaging apparatus 1 are attached to bracket 30. On that occasion, imaging apparatus fixing screw 31 of bracket 30 is screwed in a screw hole (not shown) formed on bottom side 1a of imaging apparatus 1, so that imaging apparatus 1 is fixed to bracket 30.

On the other hand, strobe body unit fixing screw 33 of bracket 30 is screwed in a screw hole (not shown) formed on side 9e of strobe body unit 9, so that strobe device 2 is fixed to bracket 30. The screw hole formed on side 9e of strobe body unit 9 is provided with detector 26 which makes detection switch 26. When strobe body unit fixing screw 33 of bracket 30 is screwed in the screw hole of strobe body unit 9, detection switch 26 outputs an ON signal and detects that strobe device 2 is attached to bracket 30.

In addition, imaging apparatus 1 and strobe device 2 are connected by connecting cord 27. That is, connector 28 provided at one end of connecting cord 27 is attached to a hot shoe (not shown) of imaging apparatus 1 and connector 29 provided at the other end of connecting cord 27 is attached to an adapter (not shown) of strobe device 2. As a result, imaging apparatus 1 and strobe device 2 are connected by connecting cord 27.

Further, connecting cord connector fixing screw 32 of bracket 30 is screwed in a screw hole (not shown) formed on connector 29 at the other end of connecting cord 27. As a result, together with strobe body unit fixing screw 33 of bracket 30 which is screwed on the side of strobe body unit 9, connecting cord connector fixing screw 32 fixes strobe device 2 to bracket 30.

An operation of strobe device 2 and imaging apparatus 1 of the present exemplary embodiment attached to a bracket will be described below with reference to FIG. 1, FIG. 2, and FIG. 5.

First, as illustrated in FIG. 2 and FIG. 5, when strobe body unit fixing screw 33 of bracket 30 is screwed in the screw hole formed on side 9e of strobe body unit 9, control section 15 of strobe device 2 detects the ON signal from detection switch 26 as described above. Then, based on the signal from detection switch 26, control section 15 detects that strobe device 2 is attached not to the hot shoe of imaging apparatus 1 but to bracket 30.

Incidentally, in the present exemplary embodiment, detection switch 26 is made of, for example, a Hall element which is configured to detect the attachment by detecting movement of a magnet incorporated in a tip portion of strobe body unit fixing screw 33. However, detection switch 26 is not limited to the Hall element. For example, detection switch 26 may detect the attachment by any method as far as the detector has a structure and a configuration which can detect that strobe body unit 9 is attached to bracket 30.

Further, control section 15 of strobe device 2 has a control mode for responding to the detection of the attachment of strobe device 2 to bracket 30 via detection switch 26 by restraining light-emitting unit 10 from moving to the region in which imaging apparatus 1 is located. The control mode is, for example, a mode for restraining light-emitting unit 10 from automatically moving into a range defined by the movement restraining range information stored in storage unit 25 of control section 15. In that case, the movement restraining range information is the angular information of light-emitting unit 10 corresponding to the region (the range) in which imaging apparatus 1 is located. The movement restraining range information is calculated from relative positional relationship between imaging apparatus 1 and strobe device 2 on bracket 30 and stored in storage unit 25 of control section 15.

Meanwhile, a teaching mode for acquiring the movement restraining range information by teaching may be set to control section 15 so that the movement restraining range information of light-emitting unit 10 is set by the teaching. In that case, control section 15 acquires the movement restraining range by causing the user to practically move light-emitting unit 10 by hand to specify the restraining range, i.e., to perform so-called teaching, and causes storage unit 25 to store the movement restraining range information. As a result, the user is allowed to set the movement restraining range optionally.

Then, when control section 15 detects that strobe device 2 is attached to bracket 30, it activates the control mode or the teaching mode to restrain light-emitting unit 10 from automatically moving to the region (the movement restraining range) in which imaging apparatus 1 is located.

As a result, control section 15 can avoid a bump or a collision of light-emitting unit 10 of strobe device 2 against imaging apparatus 1. Therefore, strobe device 2 and imaging apparatus 1 that prevent a drive system of strobe device 2 from being damaged and have superior reliability can be realized.

As described above, strobe device 2 of the present exemplary embodiment prevents the movement of light-emitting unit 10 into the movement restraining range in which imaging apparatus 1 is located in the case where strobe device 2 is attached to bracket 30 together with imaging apparatus 1. As a result, strobe device 2 can prevent light-emitting unit 10 from bumping against imaging apparatus 1 by avoiding a bump or a collision of light-emitting unit 10 against imaging apparatus 1 when light-emitting unit 10 changes the angle of orientation of light-emitting unit 10 in horizontal direction F.

In addition, when the user is to capture an image of a subject by using imaging apparatus 1, imaging apparatus 1 has to promptly change the angle of orientation of light-emitting unit 10 so as not to cause the user to miss a chance for a good shot. For that purpose, imaging apparatus 1 captures an image of a subject by speeding up a moving speed of light-emitting unit 10. At that moment, on the condition that light-emitting unit 10 moving at a high speed bumps against imaging apparatus 1, light-emitting unit 10 has a higher risk of damaging the drive system of strobe device 2. To make bad things worse, the damage may be fatal to strobe device 2 under certain circumstances.

However, with strobe device 2 of the present exemplary embodiment, even in the case where light-emitting unit 10 is caused to move at a high speed, the control mode of control section 15 prevents light-emitting unit 10 from moving into the movement restraining range in which imaging apparatus 1 is located. That is, strobe device 2 can eliminate such anxiety that the bump may damage or fatally damage the drive system of strobe device 2. Therefore, strobe device 2 and imaging apparatus 1 that have superior reliability and great safety can be realized.

It is needless to say that the imaging apparatus and the strobe device according to the present exemplary embodiment are not limited to the above described exemplary embodiment and may be subjected to various changes without departing from the spirit of the present invention.

For example, the movement restraining range information controlled in the control mode may define the angular information of light-emitting unit 10 only in the horizontal direction. Further, the movement restraining range information may define the angular information of light-emitting unit 10 both in the horizontal direction and in the vertical direction. In that manner, the imaging apparatus and the strobe device can improve versatility.

In addition, although a case where the strobe device is attached to the bracket has been taken as an example in the above described exemplary embodiment, the present invention is not limited to that. For example, in the case where the strobe device is attached to an accessory shoe of the imaging apparatus and the user is to capture an image of a subject by using the finder, the user may cause the movement restraining range within which the light-emitting unit does not bump against the user to be stored in the storage unit as the movement restraining range information of the light-emitting unit and may cause the control section of the strobe device to control the strobe device in the control mode.

Specifically, first, control section 15 of strobe device 2 detects that strobe device 2 is attached not to the bracket but to the accessory shoe via detector 26. In response to the detection, control section 15 activates the control mode or the teaching mode and sets a moving range for light-emitting unit 10 based on the angular information of light-emitting unit 10 which defines a range that restrains light-emitting unit 10 from entering (moving into) and is stored in storage unit 25. In that case, a region in which the user is present is set as the movement restraining range information.

That is, when control section 15 detects that strobe device 2 is attached to imaging apparatus 1, it activates the control mode or the teaching mode to restrain light-emitting unit 10 from automatically moving to the region (the movement restraining range) in which the user who uses the finder of imaging apparatus 1 is present.

In that manner, control section 15 can prevent light-emitting unit 10 of strobe device 2 from bumping against the user or damaging the drive system. Therefore, strobe device 2 that is safe and has superior reliability can be realized.

INDUSTRIAL APPLICABILITY

The present invention is useful for devices such as the strobe device and the imaging apparatus that are desired to prevent the light-emitting unit from bumping or colliding against the imaging apparatus or the user in the strobe device that allows the angle of orientation of the light-emitting unit to be automatically changed.

REFERENCE MARKS IN THE DRAWINGS 1 imaging apparatus
1a,9b bottom side
2 strobe device
3 capturing function unit
4 control unit
5 display unit
6 operation unit
7 peripheral I/F
8 shutter
9 strobe body unit
9a top side
9c front
9d back side
9e side
10 light-emitting unit
10a surface
11 flash discharge tube
12 variable mechanism
13 driving unit
14 angle detection unit
15 control section
16 operating unit
17 opening portion
18 vertical-direction variable mechanism
19 horizontal-direction variable mechanism
20 vertical-direction driving unit
21 horizontal-direction driving unit
22 vertical-direction angle detection unit
23 horizontal-direction angle detection unit
24 arithmetic operation unit
25 storage unit
26 detection switch (detector)
27 connecting cord
28,29 connector
30 bracket (strobe attaching device)
31 imaging apparatus fixing screw
32 connecting cord connector fixing screw
33 strobe body unit fixing screw (fixing screw)
34 main capacitor

The invention claimed is:

1. A strobe device comprising:
a strobe body unit detachable from an imaging apparatus;
a light-emitting unit rotatably coupled to the strobe body unit;
a variable mechanism configured to allow a change in an angle of orientation of the light-emitting unit with respect to the strobe body unit;
a driving unit configured to drive the variable mechanism; and
a control section configured to control the driving unit, wherein
the control section comprises a detector configured to detect that the strobe body unit is attached to an accessory shoe and a user uses a finder of the imaging apparatus, and
the control section has a control mode to restrain the light-emitting unit from moving to a region in which the user of the imaging apparatus is present, while the detector is in a state of detecting that the strobe body unit is attached to the accessory shoe and the user uses the finder of the imaging apparatus.

2. The strobe device according to claim 1, wherein the control section further comprises a storage unit configured to store angular information of the light-emitting unit corresponding to the region in which the user of the imaging apparatus is present.

3. The strobe device according to claim 2, wherein the control section further has a teaching mode to acquire, by teaching, the angular information of the light-emitting unit corresponding to the region in which the user of the imaging apparatus is present.

* * * * *